United States Patent [19]

Louvar

[11] 3,723,532
[45] Mar. 27, 1973

[54] PROCESS FOR PREPARING CYCLOALKENONES

[75] Inventor: James J. Louvar, Evanston, Ill.

[73] Assignee: Universal Oil Products Company, Des Plaines, Ill.

[22] Filed: Sept. 16, 1968

[21] Appl. No.: 760,071

[52] U.S. Cl. ........... 260/586 B, 260/297, 260/327 R, 260/347.8, 260/586 A, 260/587, 260/590, 260/563 R, 252/455 Z

[51] Int. Cl. ............................................. C07c 45/04

[58] Field of Search .................. 260/586 R, 597 R, 260/586 B, 563 R

[56] References Cited

UNITED STATES PATENTS

| | | | |
|---|---|---|---|
| 2,678,338 | 5/1954 | Linn | 260/586 B X |
| 2,684,984 | 7/1954 | Finch et al. | 260/586 B |
| 2,369,181 | 2/1945 | Rust et al. | 260/586 B |

OTHER PUBLICATIONS

Topchiev et al., "Chem. Abstracts," Vol. 54, p. 24, 563f.

*Primary Examiner*—Leon Zitver
*Assistant Examiner*—Norman Morgenstern
*Attorney*—James R. Hoatson, Jr. and Raymond H. Nelson

[57] ABSTRACT

Cycloalkenone compounds are prepared by contacting a mixture of water and a cycloalkene compound with an activated crystalline alumino-silicate at reaction conditions to form the desired product.

7 Claims, No Drawings

PROCESS FOR PREPARING CYCLOALKENONES

This invention relates to a process for preparing cycloalkenones, and particularly to a process for preparing the desired products in the presence of certain catalytic compositions of matter of a type hereinafter set forth in greater detail.

Cycloalkene compounds which contain an oxygen substituent on the ring are utilized as intermediates in the preparation of many important chemical compounds and compositions of matter. For example, cyclohexenone is an important intermediate which may be easily hydrogenated by any method known in the art, such as treatment with hydrogen at an elevated pressure in the presence of a hydrogenation catalyst such as nickel, platinum, etc., to form cyclohexanone and/or cyclohexanol, both of said compounds also being important chemical intermediates. If the product obtained by the hydrogenation comprises cyclohexanone, this compound may be useful as an intermediate in the preparation of synthetic fibers such as nylon and also for the syntheses of rubber or gasoline additives which are used to prevent deterioration which may occur due to the presence of oxygen or ozone. Likewise, if the product resulting from the hydrogenation of cyclohexenone is cyclohexanol, this compound can then be dehydrogenated to form phenol which is a well known chemical or conversely which may be oxidized to form adipic acid. The latter compound, that is, adipic acid, is used as a component in the preparation of various polyesters and/or polyamide fibers. Other cycloalkene compounds which contain an oxygen substituent in a keto-position will likewise be used in other chemical syntheses.

It is therefore an object of this invention to provide a novel process for preparing cyclic-ketone compounds.

A further object of this invention is to prepare cycloalken-1-one compounds using a crystalline alumino-silicate as a catalytic agent.

In one aspect an embodiment of this invention resides in a process for the preparation of a cycloalkenone which comprises reacting a cycloalkene with water in the presence of a catalyst comprising the hydrogen form of a crystalline alumino-silicate at a temperature in the range of from about ambient to about 250° C. and a pressure in the range of from about atmospheric to about 100 atmospheres, and recovering the resultant cycloalkenone.

A specific embodiment of this invention is found in a process for the preparation of 2-cyclohexen-1-one which comprises reacting cyclohexene with water in the presence of a catalyst comprising the hydrogen form of a faujasite at a temperature in the range of from about ambient to about 250° C. and a pressure in the range of from about atmospheric to about 100 atmospheres and recovering the resultant cyclohexen-1-one.

Other objects and embodiments will be found in the following further detailed description of the present invention.

As hereinbefore set forth, the present invention is concerned with a process for preparing cycloalkenones by treating a cycloalkene compound with water in the presence of a catalyst comprising an active crystalline alumino-silicate compound. The reaction is usually effected at reaction conditions which include a temperature in the range of from ambient (about 25° C.) up to about 250° C. or more and at a pressure in the range of from about atmospheric up to about 100 atmospheres or more. If superatmospheric pressures are used to effect the reaction of the present invention, said pressures will usually be provided for by the introduction of a substantially inert gas such as nitrogen into the reaction zone, said pressure which is used being that which is sufficient to maintain a major portion of the reactants in the liquid phase.

Cycloalkenic compounds which may be used as the starting material in the process of this invention will possess the generic formula:

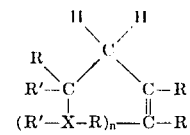

in which R is selected from the group consisting of hydrogen, alkyl of from about one to about 20 carbon atoms, aryl, cycloalkyl, alkaryl, aralkyl, halogen, nitro, amino, alkoxy and heterocyclic radicals, R' may be R or together may form an aromatic nucleus which may contain R substituents and $n$ is an integer of from 1 to about 4. Some specific representative examples of these compounds will include cyclopentene, cyclohexene, cycloheptene, cyclooctene, 3-chlorocyclopentene, 3-chlorocyclohexene, 3-chlorocycloheptene, 3-bromocyclopentene, 3-bromocyclohexene, 3-bromocycloheptene, 3-iodocyclopentene, 3-iodocyclohexene, 3-iodocycloheptene, 3-flurocyclopentene, 3-flurocyclohexene, 3-flurocycloheptene, 3-nitrocyclopentene, 3-nitrocyclohexene, 3-nitrocycloheptene, 3-aminocyclopentene, 3-aminocyclohexene, 3-aminocycloheptene, 3-methylcyclopentene, 3-methylcyclohexene, 3-methylcycloheptene, 3-ethyclcyclopentene, 3-ethylcyclohexene, 3-ethylcycloheptene, 3-propylcyclopentene, 3-propylcyclohexene, 3-propylcycloheptene, 3-isopropylcyclopentene, 3-isopropylhexene, 3-isopropylcycloheptene, 3-n-butylcyclopentene, 3-n-butylcyclohexene, 3-n-butylcycloheptene, 3-t-butylcyclopentene, 3-t-butylcyclohexene, 3-t-butylcycloheptene, the isomeric pentyl-, hexyl-, heptyl-, octyl-, nonyl-, decyl-, tetradecyl-, eicosyl-cyclopentenes, cyclohexenes, cycloheptenes, 3-phenylcyclopentene, 3-phenylcyclohexene, 3-phenylcycloheptene, 3-benzylcyclopentene, 3-benzylcyclohexene, 3-benzylcycloheptene, 3-p-tolylcyclopentene, 3-p-tolylcyclohexene, 3-p-tolylcycloheptene, 3-cyclopentylcyclopentene, 3-cyclopentylcyclohexene, 3-cyclopentylcycloheptene, 3-cyclohexylcyclopentene, 3-cyclohexylcyclohexene, 3-cyclohexylcycloheptene, 3-methoxycyclo-pentene, 3-methoxycyclohexene, 3-methoxycycloheptene, 3-ethoxycyclopentene, 3-ethoxycyclohexene, 3-ethoxycycloheptene, 3-propoxycyclopentene, 3-propoxycyclohexene, 3-propoxycycloheptene, 3-furfurylcyclopentene, 3-furfurylcyclohexene, 3-furfurylcycloheptene, 3-pyrylcyclopentene, 3-pyrylcyclohexene, 3-pyrylcycloheptene, 3-thiapyrylcyclopentene, 3-thiapyrylcyclo-hexene, 3-thiapyrylcycloheptene, 3-pyridylcyclopentene, 3-pyridylcyclohexene, 3-pyridylcycloheptene, the corresponding 4-, 5-, 6-, etc. cyclopentenes, cyclohexenes, cycloheptenes, cyclooctenes, etc., indene, 1,4-dihydronaphthalene, the correspondingly substituted indenes and 1,2-dihydronaphthalene such as 4-chloroindene, 4-bromoindene, 4-nitroindene, 4-aminoindene, 4-methoxyindene, 4-ethoxyindene, 4-methylindene, 4-ethylindene, 4-propylindene, 4-cyclopentylindene, 4-phenylindene, 4-benzylindene, 4-chloro-1,4-dihydronaphthalene, 4-bromo-1,4-dihydronaphthalene, 4-nitro-1,4-dihydronaphthalene, 4-amino-1,4-dihydronaphthalene, 4-methoxy-1,4-dihydronaphthalene, 4-ethoxy-1,4-dihydronaphthalene, 4-methyl-1,4-dihydronaphthalene, 4-ethyl-1,4-dihydronaphthalene, 4-propyl-1,4-dihydronaphthalene, 4-cyclopentyl-1,4-dihydronaphthalene, 4-phenyl-1,4-dihydronaphthalene, 4-benzyl-1,4-dihydronaphthalene, etc. It is to be understood that the aforementioned compounds are merely representative of the class of compounds which may be utilized as starting materials, and that the present invention is not necessarily limited thereto.

The treatment of cycloalkene of the type hereinbefore set forth in greater detail with water is effected in the presence of a catalyst comprising the hydrogen form of a crystalline alumino-silicate such as a faujasite. The faujasite is a zeolite, or crystalline aluminosilicate, of three-dimensional structure, the crystalline form often being described as a truncated octahedra, with pore openings in the range of from about 6 to about 15 Angstroms. It is preferred to utilize the faujasite characterized by a silica-alumina ratio of at least three. The synthetic crystalline alumino-silicates are commercially available or may be prepared in any convenient manner. For example, one preferred method comprises forming an aqueous solution of sodium aluminate and sodium hydroxide and adding thereto an aqueous sodium silicate solution. The amounts of sodium silicate solution and sodium aluminate solution are such that the mole ratio of silica to alumina in the final mixture is preferably at least 3:1. The resulting mixture is heated, usually at a temperature of about 100° C., in a closed vessel to avoid any loss of water. The crystalline alumino-silicate reaction product which precipitates from the hot reaction mixture is separated and water washed until the water in equilibrium with the crystals attains a pH of from about 9 to about 12.

The finely divided faujasite dispersed in an aqueous media is thoroughly homogenized and thereafter admixed with an acidic silica hydrosol in an amount to insure a final catalyst composite comprising from about 1.0 to about 50 weight per cent of faujasite dispersed in the amorphous silica matrix. The resulting slurry is allowed to age under acidic conditions whereby the silica is polymerized to a complex polysilicic acid and the pH is adjusted to about 6 or 7. Thereafter, the slurry is allowed to age for a time sufficient to develop optimum pore structure of the silica hydrogel. The aged hydrogel which is recovered from the slurry is thereafter treated with an ammonium salt solution for separation of substantially all of the alkali ions so that the final catalyst composite comprises less than about 0.1 weight per cent of alkali metal. After treatment with the ammonium salt, the composite can be washed in any suitable manner such as by subjecting the hydrogel to a reslurry operation and thereafter spray drying or any other method so desired.

The composite which is substantially free of alkali metal is further treated in contact with a solution, preferably an aqueous solution, comprising ions selected from the group consisting of hydrogen ions, hydrogen ion precursors and mixtures thereof. Organic and inorganic acids are generally considered as a convenient source of hydrogen ions, such acids including sulfuric acid, nitric acid, hydrochloric acid, etc. It is also possible to utilize a hydrogen ion precursor, particularly an ammonium salt such as ammonium chloride, which is decomposible to provide hydrogen ions at a temperature below the decomposition temperature of the faujasite. Other suitable ion salts including ammonium bromide, ammonium iodine, ammonium carbonate, ammonium bicarbonate, ammonium sulfate, ammonium sulfide, ammonium isocyanate, ammonium hydroxide, ammonium molybdate, ammonium benzoate, ammonium borate, ammonium citrate, etc. The anions which are introduced to the composite as a consequence of the base exchange treatment are completely separated by water washing one or more times until the composite is free of said anions. The composite is thereafter dried, generally in an air atmosphere at an elevated temperature of from about 65° C. to about 300° C. for a predetermined period of time. The resulting composite is then in the hydrogen form of the faujasite and is in an active state, thereafter being utilized as the catalyst to effect the reaction of the present invention.

The process of this invention may be effected in any suitable manner and may comprise either a batch or continuous type operation. For example, when a batch type operation is used a quantity of the cycloalkene is placed in an appropriate apparatus along with an equimolar amount of water, said apparatus containing a faujasite in an active form. A particularly suitable type of apparatus which may be used in this process comprises a rotating autoclave in the event that superatmospheric pressures are to be used. The apparatus and contents thereof are then heated to the desired operating temperature which is preferably in a range of from about 100° to about 200° C. In addition, if so desired, an inert gas such as nitrogen is pressed into the apparatus until the desired operating pressure has been reached. After maintaining the apparatus at the reaction temperature for a predetermined residence time, which may range from about 0.5 up to about 10 hours or more, heating is discontinued and the apparatus and contents thereof are allowed to return to room temperature. The excess pressure, if any, is vented and the reaction mixture is recovered. The reaction mixture is then filtered to remove the catalyst and subjected to fractional distillation whereby the desired product comprising the cycloalkenone is separated from the water and any unreacted starting materials are recovered.

It is also contemplated within the scope of this invention that the preparation of the cycloalkenone may be effected in a continual manner of operation. The cycloalkene and the water are continuously charged to a reaction zone containing the catalyst of the type hereinbefore set forth in greater detail, said zone being maintained at the proper operating conditions of temperature and pressure. The cycloalkene and the water are charged to the reactor through separate lines or may be admixed prior to entry into said zone and charged thereto in a single stream. Upon completion of the desired residence time, the reactor effluent is continuously withdrawn and subjected to separation means whereby the desired cycloalkeneone is recovered while any unreacted cycloalkene and water are recycled to form a portion of the feed stock. Inasmuch as the catalyst is in a solid form, a preferred type of operation comprises a fixed bed method in which the catalyst is disposed as a fixed bed in the reaction zone while the reactants are passed through said bed in either an upward or downward flow. Another type of operation which may be used comprises a moving bed method in which the catalyst and the reactants are passed through said zone either concurrently or countercurrently to each other. Yet another type of process which may be used comprises a slurry method in which the catalyst is carried into the reaction zone as a slurry in either one of the reactants.

Examples of cyclokenones which may be prepared according to the process of this invention include 2-cyclopenten-1-one, 2-cyclohexen-1-one, 2-cyclohepten-1-one, 2-cycloocten-1-one, 4-chloro-2-cyclohexen-1-one, 4-chloro-2-cyclopenten-1-one, 4-chloro-2-cyclohepten-1-one, 4-bromo-2-cyclohexen-1-one, 4-bromo-2-cyclopenten-1-one, 4-bromo-2-cyclohepten-1-one, 4-iodo-2-cyclohexen-1-one, 4-iodo-2-cyclopenten-1-one, 4-iodo-2-cyclohepten-1-one, 4-fluro-2-cyclohexen-1-one, 4-fluro-2-cyclopenten-1-one, 4-fluro-2-cyclohepten-1-one, 4-nitro-2-cyclohexen-1-one, 4-nitro-2-cyclopenten-1-one, 4-nitro-2-cyclohepten-1-one, 4-amino-2-cyclohexen-1-one, 4-amino-2-cyclopenten-1-one, 4-amino-2-cyclohepten-1-one, 4-methyl-2-cyclohexen-1-one, 4-methyl-2-cyclopenten-1-one, 4-methyl-2-cyclohepten-1-one, 4-ethyl-2-cyclohexene-1-one, 4-ethyl-2-cyclopenten-1-one, 4-ethyl-2-cyclohepten-1-one, 4-propyl-2-cyclohexen-1-one, 4-propyl-2-cyclopenten-1-one, 4-propyl-2-cyclohepten-1-one, 4-cyclohexyl-2-cyclohexen-1-one, 4-cyclohexyl-2-cyclopenten-1-one, 4-cyclohexyl-2-cyclohepten-1-one, 4-phenyl-2-cyclohexen-1-one, 4-phenyl-2-cyclopenten-1-one, 4-phenyl-2-cyclohepten-1-one, 4-benzyl-2-cyclohexen-1-one, 4-benzyl-2-cyclopenten-1-one, 4-benzyl-2-cyclohepten-1-one, 4-methoxy-2-cyclohexen-1-one, 4-methoxy-2-cyclopenten-1-one, 4-methoxy-2-cyclohepten-1-one, etc., indenone, 4-chloroindenone, 4-cyclopentylindenone, etc. It is to be understood that the aforementioned compounds are merely representative of the cycloalkenones which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example 16.8 grams (0.2 mole) of cyclohexene and 3.6 grams (0.2 mole) of water were placed in the glass liner of a rotating autoclave which contained 0.2 grams of a faujasite in the hydrogen form. The autoclave was sealed and heated to a temperature of 150° C., being maintained thereat for a period of 7 hours. At the end of this time, heating is discontinued, the autoclave was cooled and the reaction mixture was recovered and filtered to separate the same from the catalyst. The liquid mixture was subjected to fractional distillation to remove the water and the fraction boiling at 170° C. at atmospheric pressure was analyzed by means of a gas-liquid chromatograph Infred Analysis. This analysis disclosed the presence of 2-cyclohexen-1-one.

EXAMPLE II

A mixture of 13.6 grams (0.2 mole) of cyclopentene and 3.6 grams (0.2 mole) of water is placed in the glass liner of a rotating autoclave, said liner containing 0.2 grams of a faujasite in the hydrogen form. The liner is sealed into the autoclave and nitrogen pressed in until an initial pressure of 25 atmospheres is reached. The autoclave is then heated to a temperature of 150° C. and maintained thereat for a period of 5 hours. At the end of this time, heating is discontinued and the autoclave is allowed to return to room temperature. Upon reaching room temperature, the excess pressure is discharged and the autoclave is opened. The reaction mixture is separated from the catalyst by means of filtration, subjected to fractional distillation, the desired cut comprising 2-cyclopenten-1-one being recovered therefrom.

EXAMPLE III

A mixture comprising 25.2 grams (0.2 mole) of indene and 3.6 grams (0.2 mole) of water is placed in an autoclave along with 0.2 grams of a faujasite in the hydrogen form. The autoclave is sealed and heated to a temperature of about 200° C., being maintained thereat for a period of 7 hours. At the end of this time, the autoclave and contents thereof are allowed to return to room temperature and the reaction mixture is recovered. The product is separated from the catalyst by filtration and subjected to fractional distillation, the desired cut comprising indenone being recovered therefrom.

EXAMPLE IV

A mixture of 23.3 grams (0.2 mole) of 3-chlorohexene and 3.6 grams (0.2 mole) of water along with 0.2 grams of a faujasite in hydrogen form is placed in an autoclave which is thereafter sealed. The autoclave is pressured by means of nitrogen until an initial pressure of 25 atmospheres is reached. Following this, the autoclave is heated to a temperature of 150° C. and maintained thereat for a period of 7 hours. At the end of this time, the autoclave is allowed to cool to room temperature and the excess pressure is discharged. Following this, the autoclave is opened and the reaction mixture is recovered therefrom. The liquid product is separated from the catalyst by means of filtration, subjected to fractional distillation under reduced pressure. The desired product comprising 4-chloro-2-cyclohexen-1-one is separated, the presence of the desired product being verified by a gas-liquid chromatograph analysis.

EXAMPLE V

In this example a mixture of 19.2 grams (0.2 mole) of 3-methylcyclohexene, 3.6 grams (0.2 mole) of water and 0.2 grams of a faujasite in hydrogen form is placed in an autoclave and treated in a manner similar to that set forth in the above examples, that is, by heating the autoclave after sealing to a temperature of 150° C. and maintaining the apparatus thereat for a period of 7 hours. At the end of this time, the reaction product is recovered and treated in a manner also similar to that hereinbefore set forth whereby the desired product comprising 4-methyl-2-cyclohexen-1-one is recovered and the presence thereof verified by means of a gas-liquid chromatograph analysis.

I claim as my invention:

1. A process for the preparation of a cycloalkenone which comprises reacting a cycloalkene hydrocarbon or a halo-, nitro-, amino- or alkoxy-substitued cycloalkene hydrocarbon, each having from five to eight carbon atoms in the ring, with water in the presence of a catalyst comprising the hydrogen form of a crystalline alumino-silicate at a temperature in the range of from about ambient to about 250° C. and a pressure in the range of from about atmospheric to about 100 atmospheres, and recovering the resultant cycloalkenone.

2. The process as set forth in claim 1 in which said catalyst comprises the hydrogen form of a faujasite.

3. The process as set forth in claim 1 in which the cycloalkene is cyclohexene and said cycloalkenone reactant is 2-cyclohexen-1-one.

4. The process as set forth in claim 1 in which the cycloalkene is cyclopentene and said cycloalkenone reactant is 2-cyclopenten-1-one.

5. The process as set forth in claim 1 in which the cycloalkene is a cycloalkene hydrocarbon reactant.

6. The process as set forth in claim 1 in which the cycloalkene is 3-chlorocyclohexene and said cycloalkenone reactant is 4-chloro-2-cyclohexen-1-one.

7. The process as set forth in claim 5 in which said cycloalkene hydrocarbon is 3-methylcyclohexene and said cycloalkenone is 4-methyl-2-cyclohexen-1-one.

* * * * *